United States Patent [19]

Heintzelman

[11] 4,182,281
[45] Jan. 8, 1980

[54] SPARK PLUG ADAPTER AND PROCESS

[76] Inventor: Leo A. Heintzelman, 4990 Burlingame, Wyoming, Mich. 49509

[21] Appl. No.: 816,347

[22] Filed: Jul. 18, 1977

[51] Int. Cl.² ............................................. F02B 19/18
[52] U.S. Cl. ............................. 123/30 D; 123/32 SP; 123/169 PA; 123/191 SP; 313/143
[58] Field of Search ................ 123/30 C, 30 D, 32 K, 123/32 L, 32 B, 32 C, 32 SP, 191 R, 191 S, 191 SP, 169 P, 169 PA; 313/143

[56] References Cited

U.S. PATENT DOCUMENTS

| | | | |
|---|---|---|---|
| 1,819,108 | 8/1931 | Michelsen | 313/143 |
| 2,744,211 | 5/1956 | Berkman | 123/191 S |
| 3,814,067 | 6/1974 | Fuente | 123/32 C |
| 3,926,158 | 12/1975 | Dolza | 123/32 K |
| 3,974,818 | 8/1976 | Noguchi et al. | 123/32 SP |
| 3,982,504 | 9/1976 | Noguchi et al. | 123/32 SP |
| 4,071,001 | 1/1978 | Goto | 123/191 S |
| 4,081,711 | 3/1978 | Wax | 313/143 |
| 4,084,551 | 4/1978 | Noguchi et al. | 123/32 C |
| 4,085,713 | 4/1978 | Noguchi et al. | 123/191 S |

*Primary Examiner*—Charles J. Myhre
*Assistant Examiner*—Craig R. Feinberg
*Attorney, Agent, or Firm*—Gordon W. Hueschen

[57] ABSTRACT

A spark plug adapter has a tubular member provided with an enlarged upper portion internally threaded to receive a spark plug and the spark gap thereof and a smaller lower portion externally threaded and adapted for threading into a spark plug receiving bore of an internal combustion engine there providing a preliminary combustion chamber with an enlarged upper portion surrounding the spark gap and with a smaller lower portion opening into the internal combustion engine. The spark plug adapter is further provided with a relatively thin transverse member which extends diametrically across the tubular member below the spark gap for dividing the preliminary combustion products into two separate and substantially equal streams and to impart a turbulence thereto as they pass into the internal combustion engine. The lower portion of the tubular member terminates in an annular ledge providing a restricted opening for the passage of preliminary combustion products from the preliminary chamber into the internal combustion engine and the transverse member is spaced from said ledge and supported thereon by support means extending upwardly therefrom along and adjacent the wall of said lower portion up to said transverse member.

23 Claims, 17 Drawing Figures

U.S. Patent  Jan. 8, 1980  Sheet 1 of 2  4,182,281

SPARK PLUG ADAPTER AND PROCESS

BACKGROUND OF THE INVENTION

1. Field of Invention

The invention relates to improvements in a spark plug adapter for internal combustion engines having means for dividing preliminary combustion products into two separate and substantially equal streams and imparting turbulence thereto as they pass into the internal combustion engine and process.

2. Prior Art

In my copending application Ser. No. 667,021, filed Mar. 15, 1976, now U.S. Pat. No. 4,123,998, I have disclosed conical means for intercepting combustion products of the preliminary combustion chamber and dispersing them in an annular or coniform sheet form into the internal combustion engine. It is disclosed in this application that the cone can be supported on a transverse member adapted to be secured to the skirt of a spark plug or adapted to be fastened into the spark plug-receiving bore, of the internal combustion engine. In this device, the cone-shaped member is so large as compared with the transverse member that the effect of the cone-shaped member predominates and the transverse member functions mainly as a support for the cone-shaped member.

In my copending application Ser. No. 787,356, filed Apr. 14, 1977, I have disclosed a spark plug adapter provided with a relatively thin transverse member adapted to divide the combustion products into two separate and substantially equal streams and to impart turbulence thereto as they pass into the internal combustion engine. Means is disclosed for affixing the transverse member to the vertical wall of the lower portion of the spark plug adapter.

A number of spark plug adapters are known in the prior art. See, for example, U.S. Pat. Nos. 1,320,115; 1,357,661; 3,710,764, and 3,926,156, but none of these have a relatively thin transverse member adapted to divide the combustion products into two separate and substantially equal streams and to impart turbulence thereto as they pass into the internal combustion engine.

OBJECTS OF THE INVENTION

It is an object of the invention to provide an improved spark plug adapter and process which will increase the efficiency of an internal combustion engine. It is a further object of the invention to provide an improved spark plug adapter of the class described in which the preliminary combustion products pass into the internal combustion engine at a higher pressure. It is a further object of the invention to provide a spark plug adapter of the class described in which improved means is provided for supporting the transverse member. It is a further object of the invention to provide a spark plug adapter of the class described in which the above objects are accomplished in a simple and effective construction. It is a further object of the invention to provide a spark plug adapter of the class described in which the transverse member can be easily inserted and removed. It is a further object of the invention to provide a spark plug adapter of the class described in which the inner wall of the lower portion of the adapter is provided with means for further imparting turbulence to the preliminary combustion products. Further objects of the invention are to avoid the disadvantages of the prior art and to obtain such advantages as will appear as the description proceeds.

BRIEF DESCRIPTION OF THE INVENTION

This invention is directed to improvements in a spark plug adapter for an internal combustion engine having a tubular member provided with an enlarged upper portion internally threaded to receive a spark plug and the spark producing means thereof and a smaller lower portion externally threaded and adapted for threading into a spark plug-receiving bore of an internal combustion engine, thereby providing a preliminary combustion chamber with an enlarged upper portion surrounding the spark producing means of the spark plug and with a smaller lower portion opening into the internal combustion engine and further provided with a relatively thin transverse member which extends diametrically across the tubular member below the spark-producing means for dividing the preliminary combustion products into two separate substantially equal streams and for imparting turbulence thereto as the two streams pass from the preliminary combustion chamber into the main combustion chamber of the internal combustion engine, and is particularly directed to improvements in which the lower portion terminates in an annular ledge providing a restricted opening for the passage of preliminary combustion products from the preliminary combustion chamber into the internal combustion engine, said restricted opening functioning to increase the pressure and velocity at which the preliminary combustion products are discharged into the internal combustion engine.

Still more particularly, the invention is directed to improvements in which the transverse member is spaced from the annular ledge and supported thereon by support means extending upwardly along and adjacent the walls of the lower portion up to the transverse member. Advantageously, the support means comprises a helix disposed inwardly of the restricted opening and extending upwardly along the wall of the lower portion. The helix may either be an open helix, that is, one with space between the convolutions thereof, or a closed helix, that is, one without space between the convolutions thereof.

Advantageously, the transverse member is an integral part of the helix which is bent to extend diametrically across the top of the helix.

Advantageously, the helix is substantially coextensive with the lower portion of the tubular member whereby the transverse member is proximate to the enlarged upper portion of the preliminary combustion chamber.

Advantageously, the annular ledge slopes upwardly from the restricted opening to the wall of the lower portion and the helix tapers inwardly toward the restricted opening with a taper complementary with the slope of the annular ledge.

If desired, the restricted opening may flare outwardly into the internal combustion engine. It may also flare outwardly into the lower portion. In such case, the two outwardly flares advantageously meet in an annular knife edge. Also, when the opening flares outwardly into the internal combustion engine, it is advantageous that the flare portion extend up to the top of the annular ledge, so as to provide a similar annular knife edge. In these constructions, when the preliminary combustion products are at their maximum pressure as they pass into the internal combustion engine, they have only line contact with the knife edge and, immediately thereafter, begin to expand.

Also, the bottom convolution of the tapered portion of the helix can have a diameter smaller than the inner diameter of the annular ledge, in which case it performs a function equivalent to that of the annular knife edge. Thus, the aperture decreases in diameter up to a point at a gradually decreasing rate and then abruptly begins to increase at a gradually increasing rate.

In accordance with a modified form of the invention, the transverse member is supported by apposed upright members depending from the opposite ends thereof to the annular ledge, holding means being provided to hold the upright members in upright position.

Advantageously, the holding means comprises curved portions curved to fit the curvatures of the wall of the lower portion. The curved portion may comprise the upright members or may comprise a base member adapted to rest on the annular ledge.

Advantageously, the support means comprises a unitary wire bent to provide the base members, the upright members, and the transverse member.

In accordance with another form of the invention, the transverse member comprises a flat strip which is bent along the center line to provide two surfaces angling downwardly from the center line.

In accordance with another form of the invention, the transverse member is a flat strip integral with curved upright portions.

If desired, the portion of the unitary wire which forms the transverse member may have a portion thereof at the center of the transverse member bent upwardly just a small distance to provide a button point pointing into the combustion products. Also, when the transverse member is a flat strip, it may have a portion at the center thereof displaced upwardly to form a small cone with the apex in the center line of the tubular member and pointing into the combustion products.

DETAILED DESCRIPTION OF THE INVENTION

Figure 1:
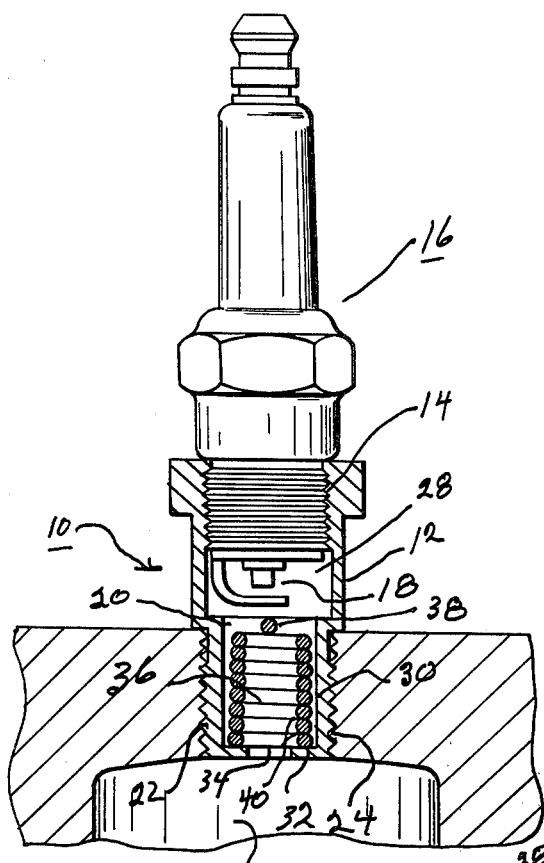
FIG. 1 is a side elevation with parts in section of one form of the invention.
Figure 2:
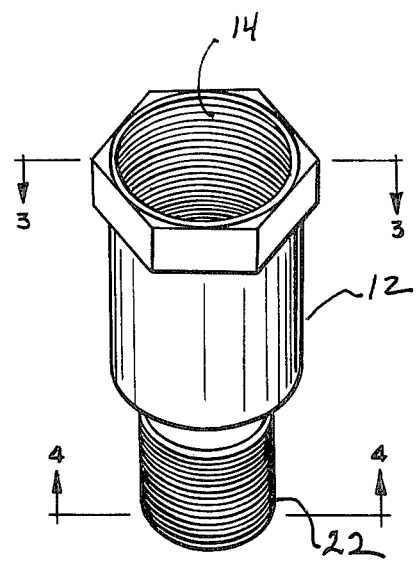
FIG. 2 is an isometric view of the adapter of FIG. 1.
Figure 3:
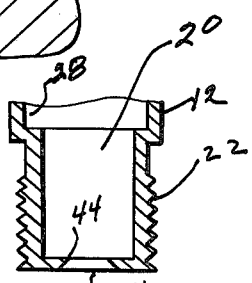
FIG. 3 is a view taken along line 3 of FIG. 2.
Figure 7:
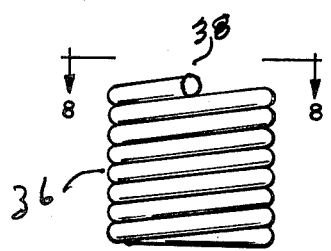
FIG. 7 is a detailed view of the construction of the helix of FIG. 1.
Figure 8:
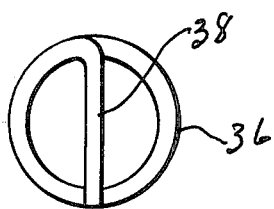
FIG. 8 is a view taken along line 8—8 of FIG. 7.
Figure 4:
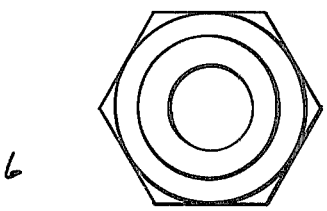
FIG. 4 is a view taken along line 4 of FIG. 2.

Referring now, particularly to FIGS. 1 through 4, 7, 8, and 9, there is shown a form of the invention comprising a tubular member 10, provided with an enlarged upper portion 12 internally threaded at 14 to receive the spark plug 16 and the spark gap 18 thereof. The adapter is further provided with a smaller lower portion 20, externally threaded at 22 and adapted for threading into a spark plug-receiving bore 24 of an internal combustion engine 26. There is thus provided a preliminary combustion chamber provided with an enlarged upper portion 28 surrounding the spark gap 18 and a smaller portion 30 opening into the internal combustion engine 26.

At the bottom of the lower portion 30 is an annular ledge 32 providing a restricted opening 34 through which the preliminary products pass out into the internal combustion engine 26.

Resting on the annular ledge 32 is a closed helix 36, the top portion of which is bent to extend diametrically across the top of the helix to provide the transverse member 38. The transverse member 38 is relatively narrow and extends diametrically across the tubular member 10.

The helix 36 is substantially coextensive with the lower portion 30, both in diameter and in height, whereby the transverse member 38 is disposed adjacent the top of the lower portion 30 and directly beneath the spark gap 18. The inside diameter of the helix 36 is substantially larger than the diameter of the opening 34, so that, notwithstanding the presence of the helix 36, the opening 34 is sufficiently restricted to cause an increase in pressure in the preliminary combustion products over that which would be obtained if the opening were not restricted.

The helix 36 provides a helical groove 40 spiraling upwardly from the annular ledge 32 to the transverse member 38. This spiral groove functions to impart additional turbulence to the preliminary combustion products which are divided by the transverse member as they pass into the lower portion 30 and tend to impart a swirling motion to the preliminary combustion products as they pass out through the restricted aperture 34.

It will be understood that the spacing shown in FIG. 1 between the helix and the wall of the lower portion 30 is exaggerated and that, in practice, there will be close fit, so that the transverse member 38 will be firmly maintained in its diametric position.

Figures 6, 9:
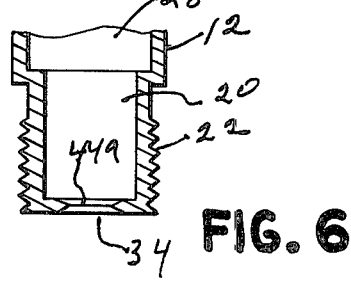
FIG. 6 is a partial section of a modified form of the invention.
FIG. 9 is a view of a modified form of the helix.

As shown in FIG. 9, the transverse member 38 has its center portion bent upwardly to form the nipple 42 lying in the center line of the adapter 10.

Figure 5:
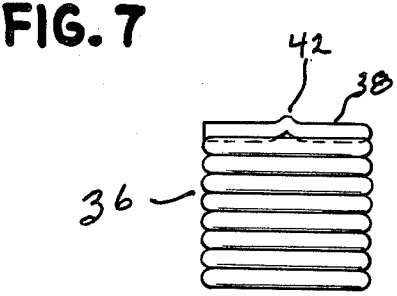
FIG. 5 is a partial section of a modified form of the invention.

As shown in FIG. 5, the restricted opening 34 may have its sides flaring outwardly toward the internal combustion engine 26, so as to form an annular knife edge 44. Also, as shown in FIG. 6, the opening 34 may also flare outwardly and upwardly to form knife edge 44a. In both modifications, the preliminary combustion products are compressed in order to pass through the opening 34 and, because of the knife edges 44 or 44a, immediately that maximum compression is obtained, expansion follows.

Figure 16:
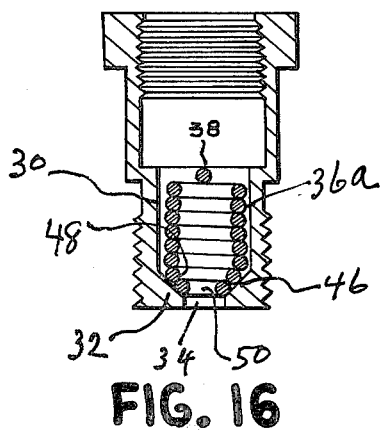
FIG. 16 is a modified form of FIG. 1.
Figure 17:
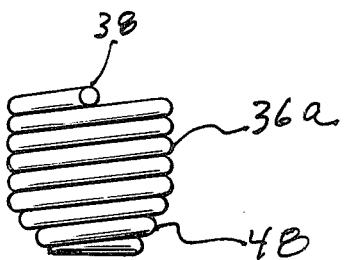
FIG. 17 is a detailed view of the construction of the helix of FIG. 16.

In the form of the invention shown in FIGS. 16 and 17, the annular ledge 32 has an upwardly sloping top 46 and the helix 36a has a tapered bottom portion 48, the taper of which is complementary to the slope of the top 46 of the annular ledge 32.

The opening 50 in the helix 36a can be larger or smaller in diameter than the diameter of the restricted opening 24. If smaller, it further restricts the passage between the adapter and the internal combustion engine and, for this purpose, has two advantages. In the first place, it is possible to vary the diameter of the restricted opening simply by replacing the helix 36a with one having a larger or smaller opening 50. In the second place, it performs a function similar to that of FIGS. 5 and 6 in that, when the preliminary combustion gases reach maximum compression in passing through the aperture 50, they immediately begin to expand.

Again, as in FIG. 1, it will be understood that there will be a close fit between helix 36a and the inner wall of the lower portion 30.

In FIGS. 10 through 15, there is shown modified forms of the support means for the transverse member 38, as well as in the shape and configuration of the transverse member 38, itself.

Figure 10:
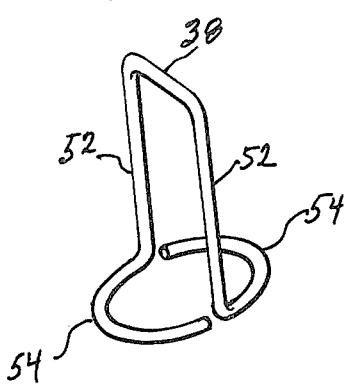
FIG. 10 is a view of a modified form of the transverse member and support therefor.
Figure 11:
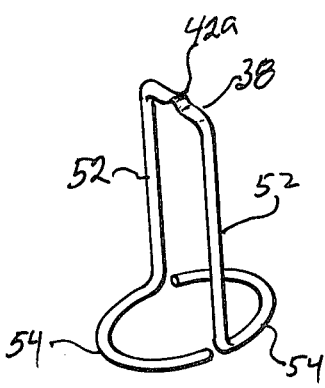
FIG. 11 is a modified form of FIG. 10.

In FIGS. 10 and 11, transverse member 38 is formed as an integral part of a wire bent to provide two upright members 52 depending from the outer edges of the transverse member 38 and two curved base members 54 which are curved to the curvature of the lower portion 30 so that, when the unit is inserted into the adapter, and the base members 54 rest on the annular flange 32, the upright members 52 will extend upwardly along the inner wall of the lower portion 30 and thus hold the transverse member 38 along a diameter of the lower portion 30.

As in FIG. 9, if desired, the transverse member may be bent up at its center to provide a nipple 42a.

Figure 12:
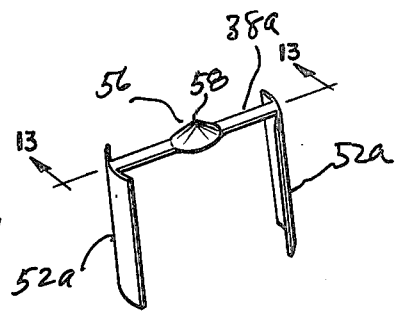
FIG. 12 is a modified form of FIG. 10.
Figure 13:
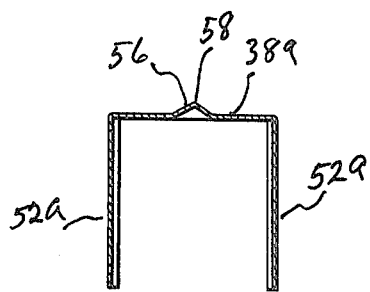
FIG. 13 is a section taken along 13—13 of FIG. 12.

In FIGS. 12 and 13, the transverse member 38a is a thin flat strip that is unitary with upright members 52a. The upright members 52a are curved to the curvature of the internal wall of the lower portion 30 and are spaced to have a snug fit therewith. Thus, when this unit is inserted in the adapter 10 with the upright members 52a resting on the annular ledge 32, the curvature thereof will hold the transverse member 38a to its position along a diameter of the lower portion 30.

The center portion of the transverse member 38a may then be bent up to provide a small cone 56 with its apex 58 axially disposed in the adapter 10 and pointing up toward the spark gap 18.

Figure 14:
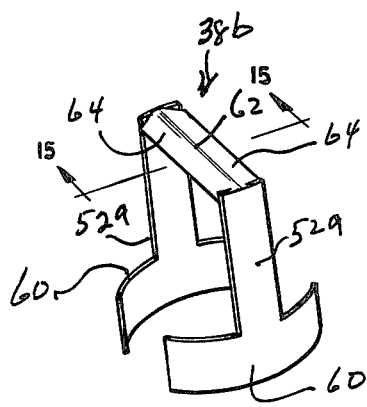
FIG. 14 is a view of a modified form of the transverse member and support therefor.
Figure 15:
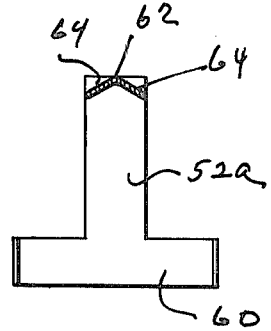
FIG. 15 is a section taken along line 15—15 of FIG. 14.

As particularly shown in FIGS. 14 and 15, it is sometimes desirable to provide the uprights 52 with curved base portions 60 to provide a more firm base. This is particularly desirable if the upright members 52a are not very wide.

Also, as shown in FIGS. 14 and 15, the transverse member 38b may be a flat member bent along the center line 62 to provide flat portions 64 sloping downwardly from the center line 62. This approximates the rounded surface provided by the transverse member 38 and has the same advantage in directing the combustion products downwardly toward opposite sides of the bottom portion of the adapter.

It will be seen that the invention provides an improved construction of a spark plug adapter of the class described by providing a restricted opening between the preliminary combustion chamber and the internal combustion engine and by providing a simple and effective unitary structure adapted to be supported on the annular ledge formed by the restricted opening which unit is easily inserted and withdrawn, so as to provide a degree of simplicity and versatility not heretofore achieved. Furthermore, the provision of support means for the transverse member in the form of a closed helix, particularly in the form shown in FIGS. 16 and 17, provides increased engine efficiency as compared with the forms of spark plug adapters shown in my copending applications.

It will be understood that the proportions may vary somewhat from those disclosed in the drawings and that the internal threading in the upper portion may be different from the external threading in the lower portion, so that the adapter can accommodate a spark plug which is different from that intended for threading into the internal combustion engine. Advantageously, the internal diameter of the upper portion is determined by the diameter of the spark plug and the outside diameter of the lower portion is determined by the diameter of the spark plug-receiving bore of the internal combustion engine. The internal bore of the hollow member, accordingly, will present a stepped-down configuration from the relatively large combustion chamber surrounding the spark gap to the relatively small extension thereof extending through the lower portion to the restricted opening into the internal combustion engine. Advantageously, the internal diameter of the lower portion is as large as possible, considering the strength of the materials involved and the stress to which they are subjected. Advantageously, the inside diameter of the lower portion is at least two-thirds ($\frac{2}{3}$) of the mean outside diameter. Advantageously, also, the inside diameter of the upper portion is essentially the same as the mean outside diameter of the lower portion. It will be understood, however, that the portion of the upper portion surrounding the spark gap 18 can have a larger diameter, if desired.

Additionally, the proportions are such that the spark gap is wholly confined in the upper portion, but such that the upper portion does not extend substantially below the spark gap. Also, it is of advantage that the support means is such that the transverse member does not lie above the lower portion.

The transverse member 38 is, transversely, relatively long and narrow. Thus, advantageously, it has a transverse thickness between about 10 and about 25 percent of the diameter of the lower portion of the preliminary combustion chamber. The axial thickness is relatively less important, but, advantageously, can range from equal to the transverse thickness to less than that.

Advantageously, the diameter of the restricted opening 34 is such that the cross-sectional area of the lower portion 30 of the preliminary combustion chamber, taking into account whatever reduction in the diameter thereof is caused by the helix 36 or other supporting means for the transverse member 38, is between about two and about three times the area of the restricted opening 34. This will cause the preliminary combustion products to increase in velocity some two or three times as a result of their passage through the restricted opening 34. The preliminary combustion products are thus jetted into the internal combustion engine 26 with a force and a degree of turbulence not heretofore obtainable and greatly increases the efficiency of the combustion.

The invention also relates to a process for improving the operation of an internal combustion engine by segregating a portion of the combustible mixture in said internal combustion engine and effecting a preliminary combustion of the segregated combustible mixture, dividing the preliminary combustion products into two separate and substantially equal streams, imparting turbulence thereto, and constraining said preliminary combustion products to pass through a restricted opening, thereby to compress the preliminary combustion products and to increase the velocity thereof, and then jetting the thus treated preliminary combustion products into the remainder of the combustible mixture.

It is to be understood that the invention is not to be limited to the exact details of operation or structure shown and described, as obvious modifications and equivalents will be apparent to one skilled in the art.

I claim:

1. A spark plug adapter for an internal combustion engine comprising a tubular member provided with an enlarged upper portion internally threaded to receive a spark plug and the spark-producing means thereof and a smaller lower portion externally threaded and adapter for threading into a spark plug-receiving bore of an internal combustion engine thereby providing a preliminary combustion chamber with an enlarged upper portion surrounding said spark-producing means and with a smaller lower portion opening into said internal combustion engine and, further provided with a relatively thin axially-symmetrical transverse member which extends diametrically across said tubular member below said spark-producing means for dividing the preliminary combustion products into two separate and substantially equal streams and for imparting turbulence thereto as the two streams pass from the preliminary combustion chamber into the main combustion chamber of the internal combustion engine, and in which said lower portion terminates in an annular ledge providing a restricted opening for passage of preliminary combustion products from said said preliminary combustion chamber into said internal combustion engine, said restricted opening functioning to increase the pressure and velocity at which the preliminary combustion products are discharged into the internal combustion engine.

2. The spark plug adapter of claim 1, in which said restricted opening has a diameter such that the cross-sectional area of the lower portion of said preliminary combustion chamber is between about two and about three times the area of said restricted opening.

3. The spark plug adapter of claim 1, in which said restricted opening flares outwardly from an annular knife edge into said internal combustion engine.

4. The spark plug adapter of claim 3, in which said restricted opening also flares outwardly from said knife edge into said lower portion.

5. The spark plug adapter of claim 1, in which said transverse member is spaced from said ledge and supported thereon by support means extending upwardly therefrom along and adjacent the wall of said lower portion up to said transverse member.

6. The spark plug adapter of claim 5, in which said transverse member comprises a flat strip which is bent along the center line thereof to provide two surfaces angling downwardly from said center line.

7. The spark plug adapter of claim 5, in which said support means comprises opposed upright members depending from opposite ends of said transverse member to said annular ledge and in which holding means is provided to hold said upright members in upright position.

8. The spark plug adapter of claim 7, in which said holding means comprises curved portions curved to fit the curvature of the wall of said lower portion.

9. The spark plug adapter of claim 8, in which said curved portions comprise said upright members.

10. The spark plug adapter of claim 9, in which said transverse member is a flat strip integral with said curved upright portions.

11. The spark plug adapter of claim 10, in which said flat strip at the center thereof has a portion displaced upwardly to form a cone with the apex thereof in the center line of said adapter and pointing toward the spark-producing means of the spark plug.

12. The spark plug adapter of claim 8, in which said curved portions comprise base members adapted to rest on said annular ledge.

13. The spark plug adapter of claim 12, in which said support means comprises a unitary wire bent to provide said base members and said upright members and said transverse member.

14. The spark plug adapter of claim 13, in which said transverse member has an integral bent-up portion at the center thereof.

15. In a spark plug adapter for an internal combustion engine having a tubular member provided with an enlarged upper portion internally threaded to receive a spark plug and the spark-producing means thereof and a smaller lower portion externally threaded and adapted for threading into a spark plug-receiving bore of an internal combustion engine thereby providing a preliminary combustion chamber with an enlarged upper portion surrounding said spark-producing means and with a smaller lower portion opening into said internal combustion engine and, further provided with a relatively thin transverse member which extends diametrically across said tubular member below said spark-producing means for dividing the preliminary combustion products into two separate and substantially equal streams and for imparting turbulence thereto as the two streams pass from the preliminary combustion chamber into the main combustion of the internal combustion engine, the combination in which said lower portion terminates in an annular ledge providing a restricted opening for passage of preliminary combustion products from said preliminary combustion chamber into said internal combustion engine, said restricted opening functioning to increase the pressure and velocity at which the preliminary combustion products are discharged into the internal combustion engine, in which said transverse member is spaced from said ledge and supported thereon by support means extending upwardly therefrom along and adjacent the wall of said lower portion up to said transverse member, and in which support means comprises a helix disposed inwardly of said restricted opening and extending upwardly along the wall of said lower portion.

16. The spark plug adapter of claim 15, in which said annular ledge slopes upwardly from said restricted opening to the wall of said lower portion and in which the bottom portion of said helix tapers inwardly toward said restricted opening with the taper complementary with the slope of said annular ledge.

17. The spark plug adapter of claim 16, in which the bottom opening of said helix has a smaller diameter than that of said restricted opening.

18. The spark plug adapter of claim 15, in which said helix is a closed helix.

19. The spark plug adapter of claim 18, in which said transverse member is an integral part of said helix bent to extend diametrically across the tip of said helix.

20. The spark plug adapter of claim 19, in which said transverse member has an integral bent-up portion at the center thereof.

21. The spark plug adapter of claim 19, in which said helix is substantially coextensive with said lower portion and said transverse member is proximate to the enlarged upper portion of said preliminary combustion chamber.

22. The spark plug adapter of claim 21, in which said annular ledge slopes upwardly from said restricted opening to the wall of said lower portion and in which the bottom portion of said helix tapers inwardly toward said restricted opening with the taper complementary with the slope of said annular ledge.

23. The spark plug adapter of claim 22, in which the bottom opening of said helix has a smaller diameter than that of said restricted opening.

* * * * *